United States Patent [19]

Hunsbedt et al.

[11] Patent Number: 5,021,211

[45] Date of Patent: Jun. 4, 1991

[54] LIQUID METAL COOLED NUCLEAR REACTORS WITH PASSIVE COOLING SYSTEM

[75] Inventors: Anstein Hunsbedt, Los Gatos; Alan W. Fanning, San Jose, both of Calif.

[73] Assignee: General Electric Company, San Jose, Calif.

[21] Appl. No.: 384,385

[22] Filed: Jul. 25, 1989

[51] Int. Cl.$^5$ .............................................. G21C 15/18
[52] U.S. Cl. .................................... 376/299; 376/290; 376/404
[58] Field of Search .............. 376/299, 298, 402, 403, 376/404, 302, 303, 304, 287, 290

[56] References Cited

U.S. PATENT DOCUMENTS

| | | | |
|---|---|---|---|
| 3,753,856 | 8/1973 | Ash | 376/302 |
| 4,295,934 | 10/1981 | Robin | 376/403 |
| 4,302,296 | 11/1981 | Sharbaugh et al. | 376/404 |
| 4,362,694 | 12/1982 | Kayser | 376/403 |
| 4,508,677 | 4/1985 | Craig et al. | 376/299 |
| 4,664,876 | 5/1987 | Uotani et al. | 376/404 |
| 4,678,626 | 7/1987 | Germer | 376/299 |

Primary Examiner—Daniel D. Wasil
Attorney, Agent, or Firm—R. R. Schroeder

[57] ABSTRACT

A liquid metal cooled nuclear reactor having a passive cooling system for removing residual heat resulting from fuel decay during reactor shutdown. The passive cooling system comprises a plurality of cooling medium flow circuits which cooperate to remove and carry heat away from the fuel core upon loss of the normal cooling flow circuit to areas external thereto.

10 Claims, 1 Drawing Sheet

LIQUID METAL COOLED NUCLEAR REACTORS WITH PASSIVE COOLING SYSTEM

The Government of the United States has rights in this invention under Contract No. DE-AC03-88SF 17467.

FIELD OF THE INVENTION

This invention relates to an improvement in the passive cooling of liquid metal cooled nuclear reactors having a pool of liquid metal coolant with the heat generating fissionable fuel core substantially immersed in the liquid metal pool, such as the system disclosed in U.S. Pat. No. 4,508,677, issued Apr. 2, 1985.

BACKGROUND OF THE INVENTION

In the operation of liquid sodium or sodium-potassium metal cooled nuclear reactors for power generation, it may be necessary to shut down the fission reaction of the fuel to deal with emergencies or carry out maintenance services. Reactor shut down is attained by inserting neutron absorbing control rods into the core of fissionable fuel to deprive the fuel of the needed fission producing neutrons. However, decay of the fuel in the shut down reactor continues to produce heat in significant amounts which must be dissipated from the reactor unit.

The heat capacity of the liquid metal coolant and adjacent structure aid in dissipating the residual heat. However, the structural materials of the nuclear reactor may not be capable of safely withstanding prolonged high temperatures. For example the concrete of the walls of the typical housing silo may splay and crack when subjected to high temperatures. Accordingly, auxiliary cooling systems are commonly utilized to safely remove heat from the nuclear reactor structure during shut down.

Conventional nuclear reactors have utilized a variety of elaborate energy driven cooling systems to dissipate heat from the reactor. In many of the situations warranting a shutdown, the energy supply to the cooling systems make the cooling systems themselves subject to failure. For example, pumps and ventilation systems to cool the core may fail. Furthermore, if operator intervention is necessary, there are foreseeable scenarios in which the operator would be unable to provide the appropriate action. The most reliable and desirable cooling system would be a completely passive system which could continuously remove the residual heat generated after shutdown.

Liquid metal cooled reactors such as the modular type disclosed in U.S. Pat. No. 4,508,677, utilizing sodium or sodium-potassium as the coolant, provide numerous advantages. Water cooled reactors operate at or near the boiling point of water. Any significant rise in temperature results in the generation of steam and increased pressure. By contrast, sodium or sodium-potassium has an extremely high boiling point, approximately 1800 degrees Fahrenheit at one atmosphere pressure. The normal operating temperature of the reactor is about 900 degrees Fahrenheit. Because of the high boiling point of the liquid metal, the pressure problems associated with water cooled reactors and the steam generated therein are eliminated. The heat capacity of the liquid metal coolant permits the coolant be heated several hundred degrees Fahrenheit above normal operating temperatures without danger of structural failure in the reactor.

The reactor vessels for pool-type liquid-metal cooled reactors are essentially open top cylindrical tanks without any perforations to interrupt the integrity of the vessel walls. Sealing of side and bottom walls is essential to prevent the leakage of liquid metal from the primary vessel. The vessel surfaces must also be accessible for the rigorous inspections required by safety considerations.

In the typical sodium cooled reactor, two levels of sodium circuit loops are used. Usually, a single primary circuit loop and two or more secondary circuit loops are used. The primary circuit loop contains very radioactive sodium which is heated by the fissionable fuel rods. The primary circuit loop passes through heat exchangers to exchange the heat from the fuel with one of the nonradioactive secondary sodium circuit loops. In general, sodium cooled reactors are designed to incorporate redundant secondary circuit loops in the event of failure of one circuit loop.

Upon shutdown of the reactor by fully inserting the control rods into the core of fuel, residual heat continues to be produced and dissipated according to the heat capacity of the plant. Assuming that the reactor has been at full power for a long period of time, during the first hour following shutdown an average of about 2% of full power continues to be generated. The residual heat produced continues to decay with time.

This invention comprises an improvement in the passive cooling system for removing shutdown decay heat from a liquid metal cooled nuclear reactor disclosed and claimed in U.S. Pat. No. 4,678,626, issued Dec. 2, 1985.

The disclosed contents of the above noted U.S. Pat. Nos. 4,508,677 and 4,678,626, comprising related background art, are incorporated herein by reference.

SUMMARY OF THE INVENTION

This invention comprises an improvement in prior passive cooling designs for liquid metal cooled nuclear reactors such as those described in U.S. Pat. No. 4,678,626. The invention provides means for cooling of the nuclear reactor fuel core in the unlikely event of a significant sequential breach of both the reactor and the containment vessels which results in the interruption of the normal operation of the primary circuit loop of the liquid metal coolant through the fuel core due to its loss from leakage. Substantially continuous cooling of the fuel core is needed to preclude the potential for core overheating and subsequent structural damage. This invention comprises a system of a primary and secondary heat exchanger and natural convection flow paths of liquid metal coolant through the reactor components which in combination provide for efficient fuel core heat removal reducing the possibility of core overheating and structure failure.

A prior system for removing heat employed in liquid metal cooled nuclear reactors of the type disclosed in U.S. Pat. No. 4,508,677 is fully passive and operates continuously through the phenomenon of natural convection in fluids, conduction, convection, and thermal radiation. In this system, heat is transported from the heat producing reactor fuel core out to the reactor vessel by means of natural convection flow of the liquid metal coolant through the primary cooling circuit loop. The transported heat is in turn conducted out through the wall of the reactor vessel and on through the inert gas filled space intermediate the reactor and containment vessels substantially by the mechanism of thermal radiation. Heat transferred outward away from the containment vessel wall is continued on into the surrounding atmosphere, by natural convection to the naturally convecting surrounding air and partially by thermal radiation.

The reactor fuel core cooling capability of the above system, such as in U.S. Pat. No. 4,678,626, would be reduced significantly if both the reactor and containment vessels are breached whereby the level of the liquid metal coolant contained within the reactor vessel drops from its normal operating height due to leakage loss to a low point inhibiting the natural convection flow. Such an occurrence creates the potential for fuel core heatup followed by a slow liquid metal coolant boiloff, such as for example about five days for sodium in typical liquid metal cooled reactors, which ultimately could result in a serious accident.

Alternative means have been proposed for fuel decay heat removal from the primary coolant circuit loop following a vessel breach accompanied with a significant loss of liquid metal coolant. These means undertake to maintain the bulk of the liquid metal coolant at temperatures below safe limits. Nevertheless, high fuel core temperature peaks would be likely to occur because the liquid metal coolant flow through the core would be terminated with such a loss. Thus, removal of decay heat from the fuel core would be primarily by heat conduction through an extensive mass of enclosing stainless steel, such as about eight inches total, which would require a temperature difference between the opposite surface areas of approximately 700 degrees F to transport the heat from within the core region to an exterior region. Fuel core temperatures of such a magnitude could result in some failures of fuel unit containers but a major failure is unlikely.

OBJECTS OF THE INVENTION

It is a primary object of this invention to provide an improved passive cooling method and system for liquid metal cooled nuclear reactors for the removal of decay and sensible heat.

It is also an object of this invention to improve the efficiency of heat transfer in passive cooling of liquid metal cooled nuclear reactors comprising a core of fissionable fuel substantially immersed within a pool of liquid metal coolant.

It is another object of this invention to provide an improved passive cooling system for liquid metal cooled nuclear reactors comprising means for effective thermal energy transfer from the fuel core area outward to a cooling fluid heat transferring medium external to the fuel core, by means of natural convection.

It is a further object of this invention to provide a heat removing system for liquid metal cooled nuclear reactors which is entirely passive and operates continuously by the inherent phenomenon of natural convection in fluids, conduction, convection, and thermal radiation.

It is a still further object of this invention to provide an improvement in passive systems for removing decay and sensible heat produced during shut down in a liquid metal cooled nuclear reactor utilizing multiple fluid medium cooling circuits.

DETAILED DESCRIPTION OF THE INVENTION

Figure 1:
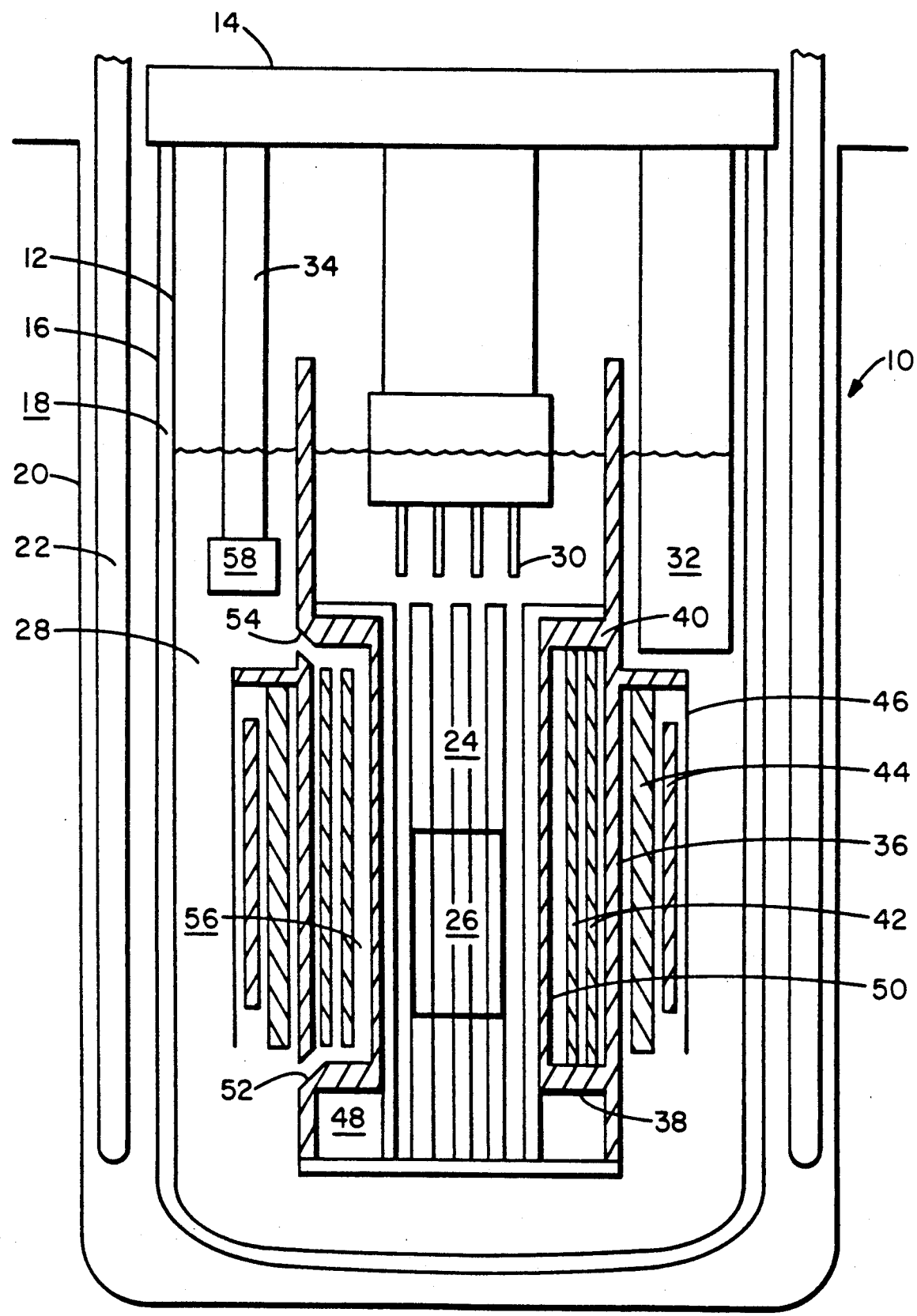
FIGURE 1 is a schematic illustration of a liquid metal cooled nuclear reactor plant in crosssection.

Referring to the drawing, an embodiment of a pool-type, liquid metal cooled nuclear reactor plant 10, comprises a reactor vessel 12, typically consisting of a cylindrical vessel positioned with its longitudinal axis extending vertically upright, and having an open upper end provided with a removable cover 14. Reactor vessel 12 is surrounded concentrically by a containment vessel 16 in spaced apart relationship. The intermediate space 18 between vessels 12 and 16 is sealed and filled with an inert gas such as argon to provide a safe nonreactive medium with any liquid metal coolant, such as sodium should it escape from the reactor vessel into space 18.

The concentrically arranged reactor and containment vessels 12 and 16 are in turn enclosed within a spaced apart housing vessel 20, such as a concrete silo substantially buried in the ground. The space intermediate the housing vessel 20 and the containment vessel 16 can include heat transfer tubes 22, or like means for removing heat from this area if need be.

Reactor vessel 12 contains fuel and blanket assemblies 24 having a core of heat producing fissionable fuel 26 enclosed therein. The reactor vessel 12 is substantially filled with a liquid metal coolant such as sodium, with the heat producing fuel core 26 and assemblies 24 immersed therein for effective heat transfer away therefrom and to an appropriate heat consuming service such as the generation of electrical power. The fuel 26 and blanket assemblies 24 are provided with a multiplicity of vertical coolant passages extending through the axial length thereof for flow of the coolant up therethrough to carry away fuel core produced heat.

Control rods 30 are suspended above the fuel core 26 and blanket assemblies 24 and are individually reciprocally movable down into the fuel core 26 and back up out therefrom to control the fission activity and rate of the fuel of the core 26, and in turn production of thermal energy.

An electromagnetic pump 32, or mechanical pump, circulates the liquid metal coolant 28 through a primary circuit loop comprising a route upward through the blanket assemblies 24 including the fuel core 26 for carrying away the heat produced by the fission reaction or decay. An intermediate heat exchanger unit 34 is positioned in a peripheral area of the reactor vessel 12 for removing heat from the circulating coolant 28.

The fuel core 26 and blanket assemblies 24, are surrounded in spaced apart relation and fixed in position by a fuel assembly support cylinder 36. Support cylinder 36 has two inward projecting flanges, a lower flange 38 and upper flange 40 for supporting the fuel assembly 24. Radiation shielding units 42 are positioned intermediate the support cylinder 36 and the fuel assembly 24 between the flanges 38 and 40, and additional radiation shielding units 44 are positioned external to and surrounding at least a substantial portion of the support cylinder adjacent to the fuel assembly 24.

In a liquid metal cooled nuclear reactor of the above described type, a typical primary circuit loop for the coolant 28 comprises a course upward through the fuel assembly 24 and core 26 whereby heat is absorbed and carried up into the area above the assembly 24, or "hot pool". The upward flow of high heat carrying coolant continues and it enters the intermediate heat exchanger unit(s) 34 in its upper portion and passes down therethrough giving up heat and exiting therefrom in a peripheral area, or "cold pool", around the outside of the flow guide 46, or skirt, extending around the composite of fuel assembly support cylinder 36 and radiation shielding units 42 and 44. From the peripheral cold pool the heat reduced coolant 28 reverses direction at the bottom of the flow guide 46 and moves upward through the radiation shielding units 42 and into the electromagnetic pump 32. Coolant 28 is moved through the pump 32 and then via conducts not shown, down into an inlet plenum 48 beneath the fuel assembly 24. The coolant 28 then recycles continuously through the same course including again upward through the fuel assembly 24 and core 26 absorbing heat and continuing the cooling circuit.

Accordingly, if the liquid metal coolant 28 level should drop due to leakage from a breach of the reactor vessel 12 and the containment vessel 16, the coolant flow through the aforesaid course including the heat producing fuel assembly 24 and core 26, could be interrupted and its heat removing function terminated. This would occur when the level of the liquid metal coolant falls below the upper end of the fuel assembly support cylinder 36 and the coolant flow through the designed course of the primary circuit loop is precluded, as shown by the reduced coolant level illustrated in the drawing.

Under such circumstances the only means for heat removal from the fuel core 26 and overhead "hot pool" area is by conduction through the fuel assembly support cylinder 36 and adjacent components comprising the radiation shielding units 42 and 44 at the perimeter of the fuel assembly 24 and core 26. Natural convection flow patterns will occur in the fuel core 26 and overhead hot pool area with a cycling upflow in the center portion of the fuel assembly 24 and down flow in the periphery outward from the fuel core. This natural convection flow of the coolant will cool the active fuel of the core 26 and tend to equalize the temperatures within the fuel core 26 and blanket assemblies 24. However, conduction of heat through the fuel assembly support cylinder 36 and the radiation shielding material outward into the peripheral area of "cold pool" is estimated to require a temperature difference between such portions of up to about 700 degrees F. Such a high temperature difference can lead to high average liquid metal coolant temperature conditions and the boiling of commonly utilized sodium coolant unless the system can be maintained at a relatively low temperature of less than about 800 degrees F through some means of decay heat removal. The effects of such high temperature as would likely be encountered in the system are a matter of conjecture but some fuel container failures are likely.

According to this invention, a primary heat exchange means comprising a thick walled, about 0.5 to 0.75 inches, stainless steel cylinder 50, is applied surrounding the fuel assembly 24 including the core 26, and within the fuel assembly support cylinder 36 and the radiation shielding units 42 and 44 on both sides of the support cylinder. The heat exchanger cylinder 50 typically extends between the inward extending lower and upper flanges 38 and 40 of the fuel assembly support cylinder 36, and preferably is affixed to the inner periphery of each of such flanges by welding or other suitable securing means as illustrated in the drawing.

Additionally the invention includes the provision of fluid flow slots passing through the fuel assembly support cylinder 36 between its inward projecting lower and upper flanges 38 and 40. At least one such flow slot 52 is located in a lower portion of the fuel assembly support cylinder 36, preferably adjacent to the lower flange 38, and at least one such flow slot 54 is located in an upper portion of the fuel assembly support cylinder 36, preferably adjacent to the upper flange 40. Preferably a multiplicity of such fluid flow slots 52 and 54 are provided to enable relatively high volume flow therethrough.

Lower fluid flow slots 52 and upper fluid flow slots 54 provide access into and out from the space 56 intermediate the fuel assembly support cylinder 36 and the introduced primary heat exchanger cylinder 50. Although space 56 contains radiation shielding units 42, ample area is provided to accommodate fluid flow from the lower slots 52 up to the upper slots 54, primarily passing over the outer surface of primary heat exchanger cylinder 50. An auxiliary heat exchanger cooling unit(s) 58 is located within the peripheral area of the reactor vessel 12 exterior of the fuel assembly support cylinder 36. The auxiliary cooling unit(s) 58 preferably is located at the lower end of the intermediate heat exchanger unit(s) 34.

The foregoing unique construction of this invention comprising the primary heat exchanger cylinder 50 and lower and upper fluid flow slots 52 and 54, provides for a distinct heat exchanging, natural convection flow path for the liquid metal coolant which continuously carries away excessive heat from the area of the fuel assembly and blanket 24 and fuel core 26 contained therein.

As pointed out herein before, following a significant reduction in the level of this liquid metal coolant 28 within the reactor vessel 12 due to leakage, the normal primary circuit loop for coolant circulating through the complete system for transferring heat from the fuel core 26 out from the reactor is interrupted. Thus, the remaining coolant circulation attributable to natural convection flow is essentially limited to a restructured circuit of upward through the fuel core 26 and, high heat producing central area of the fuel assembly and blanket 24 motivated by the heat absorbed from the fuel core. This heated coolant rises from the core to the so-called "hot pool" area above the fuel assembly, then reverses its direction and flows downward in the peripheral, low heat producing area of the fuel assembly 24 surrounding the heat producing fuel core 26 to the underlying inlet plenum 48, whereupon it again reverses its direction of flow and returns up through the centered fuel core 26 repeating the cycle continuously while motivated with heat generated within the fuel core. However, transfer of heat away from this confined circuit is highly ineffective in an earlier design due to the large amount of steel shielding present.

With the construction of this invention, the liquid metal coolant 28 remaining within the area of the reactor vessel 12 external to the fuel assembly support cylinder 36, is able to flow by natural convection through the lower fluid flow slots 52 into the space 56, passing over the external surface of the primary heat exchanging cylinder 50, then out through upper fluid flow slots 54. Heat carried by the restricted circuit passing through the fuel core 26 and around within the fuel assembly 24 and in contact with the primary heat exchanging cylinder 50, passes through the wall of cylinder 50 where it is absorbed by the coolant circulating through space 56. The coolant, motivated by natural convection from heat provided through cylinder 50 from the fuel core 26 travels upward through space 56 and out slot 54 whereupon it contacts an auxiliary heat exchanger unit(s) 58, giving up absorbed heat. Thus cooled, the coolant reverses its path and moves downward within the peripheral area of the reactor vessel 12 external of the flow guide 46 whereupon it again reverses its course and returns again upward into the lower fluid flow slot 52 and space 56 to repeat the cycle continuously while heat is produced. An alternative means of rejecting heat from the cold pool is by the use of the heat transfer tubes 22 which contain naturally circulating air.

Evaluation of the thermal performance of the unique construction of this invention indicates that it would result in the approximately 2.5 megawatts heat removal desired from the restricted fuel assembly circuit with only about a one hundred degree Fahrenheit wall temperature difference between the fuel assembly area and the outer perimeter area. This compares to the approximately 700 degree F temperature difference required in the prior design with a reduced liquid metal coolant comprising sodium.

The principal advantage of this invention is that the fuel core temperatures following an extremely unlikely double vessel breach and coolant leak event, can be maintained below the fuel container failure limit. Thus, the consequences of such an event and any resulting hazards is greatly reduced because the fuel containers confine radioactive isotopes and volatile fission produced gases.

What is claimed is:

1. A passive cooling system for liquid metal cooled nuclear reactors consisting essentially of the combination of a reactor vessel enclosing a heat generating core and assembly containing fissionable fuel surrounded by a spaced apart encircling fuel core assembly support cylinder provided with an upper and a lower inward projecting flange for securing the fuel core assembly within the reactor vessel, a primary heat exchanger cylinder positioned concentrically intermediate the fuel core assembly support cylinder and the fuel core assembly in spaced apart relation with each the support cylinder and the fuel core assembly, said reactor vessel being substantially filled with liquid metal coolant whereby the fuel core assembly is submerged therein, the fuel core assembly having a multiplicity of vertical coolant passages extending through the axial length thereof providing for a primary heat exchanging convection circuit for the liquid metal coolant passing upward through the heat producing fuel core to an area above the fuel core assembly and returning around down through a space between the fuel core assembly and the primary heat exchanger cylinder for recycling around and up through the fuel core assembly, a pump extending down projecting below the surface of the liquid metal coolant for circulating the coolant through the primary heat exchanging circuit, said support cylinder having at least one flow slot passing therethrough in an upper portion of the cylinder and at least one flow slot passing therethrough in a lower portion of the cylinder providing for a secondary heat exchanging convection circuit for the liquid metal coolant passing into the support cylinder through the lower flow slot and upward through a space between the primary heat exchanger cylinder and the core support cylinder and then out from the space through the upper flow slot and returning around down to the lower flow slot for carrying heat away from the primary heat transferring circuit, said fluid flow slots passing through the fuel assembly support cylinder between the inward projecting upper and lower flanges of the assembly support cylinder, and a flow guiding skirt extending around the assembly support cylinder in spaced apart relationship between the upper and lower flow slots whereby the liquid metal coolant flows downward external to the flow guiding skirt when circulating through the secondary heat exchanging convection circuit.

2. The passive cooling system for liquid metal cooled nuclear reactors of claim 1, wherein the primary heat exchanger cylinder is affixed to the upper and lower inward projecting flange of the fuel core assembly support cylinder.

3. The passive cooling system for liquid metal cooled nuclear reactors of claim 1, wherein at least one unit of radiation shielding material is provided about the outer portion of the fuel core assembly support cylinder.

4. The passive cooling system for liquid metal cooled nuclear reactors of claim 1, wherein at least one unit of radiation shielding material is provided in the space between the fuel core assembly support cylinder and the primary heat exchanger cylinder.

5. A passive cooling system for liquid metal cooled nuclear reactors, consisting essentially of the combination of a reactor vessel enclosing a heat generating core and assembly containing fissionable fuel surrounded by a spaced apart encircling fuel core assembly support cylinder provided with an upper and a lower inward projecting flange for securing the fuel core assembly within the reactor vessel, a primary heat exchanger cylinder positioned concentrically intermediate the fuel core assembly and the fuel core assembly support cylinder in spaced apart relation with each the fuel core assembly and the support cylinder and affixed to the upper and lower flanges of the support cylinder, said reactor vessel being substantially filled with liquid metal coolant whereby the fuel core assembly is submerged therein, the fuel core assembly having a multiplicity of vertical coolant passages extending through the axial length thereof providing for a primary heat exchanging convection circuit for the liquid metal coolant passing upward through the heat producing fuel core to an area above the fuel core assembly and returning around down through a space between the fuel core assembly and the primary heat exchanger cylinder for recycling around and up through the fuel core assembly, an electromagnetic pump extending down projecting below the surface of the liquid metal coolant for circulating the coolant through the primary heat exchanging circuit, said support cylinder having multiple flow slots passing therethrough in an upper portion of the cylinder and multiple flow slots passing therethrough in a lower portion of the cylinder providing for a secondary heat exchanging convection circuit for the liquid metal coolant passing into the support cylinder through the lower flow slots and upward through a space between the primary heat exchanger cylinder and the core support cylinder and then out from the space through the upper flow slots and returning around down to the lower openings for carrying heat away from the primary heat transferring circuit, said fluid flow slots passing through the fuel assembly support cylinder between the inward projecting upper and lower flanges of the assembly support cylinder, and a flow guiding skirt extending around the assembly support cylinder in spaced apart relationship between the upper and lower flow slots whereby the liquid metal coolant flows downward external to the flow guiding skirt when circulating through the secondary heat exchanging convection circuit.

6. The passive cooling system for liquid metal cooled nuclear reactors of claim 5, having an auxiliary cooling heat exchanger unit positioned to act upon the secondary heat exchanging convection circuit of liquid metal coolant by removing heat therefrom.

7. The passive cooling system for liquid metal cooled nuclear reactors of claim 5, wherein units of radiation shielding material are provided about the outer perimeter of the fuel core assembly support cylinder.

8. The passive cooling system for liquid metal cooled nuclear reactors of claim 5, wherein units of radiation shielding material are provided in the space between the fuel core assembly support cylinder and the primary heat exchange cylinder.

9. The passive cooling system for liquid metal cooled nuclear reactors of claim 5, wherein heat exchanger tubes are provided adjacent to the exterior of the reactor and containing vessels.

10. A passive cooling system for liquid metal cooled nuclear reactors, consisting essentially of the combination of a reactor vessel surrounded by a containment vessel in spaced apart relation and enclosing a heat generating core and assembly containing fissionable fuel surrounded by a spaced apart encircling fuel core assembly support cylinder provided with an upper and a lower inward projecting flange for securing the fuel core assembly within the reactor vessel, a primary heat exchanger cylinder positioned concentrically intermediate the fuel core assembly and the fuel core assembly support cylinder in spaced apart relation with each the fuel core assembly and the support cylinder and affixed to the upper and lower flanges of the support cylinder, said reactor vessel being substantially filled with liquid metal coolant whereby the fuel core assembly is submerged therein, the fuel core assembly having a multiplicity of vertical coolant passages extending vertically through the axial length thereof providing for a primary heat exchanging convection circuit for the liquid metal coolant passing upward through the heat producing fuel core to an area above the fuel core assembly and returning around down through a space between the fuel core assembly and the primary heat exchanger cylinder for recycling around and up through the fuel core assembly, an electromagnetic pump extending down projecting below the surface of the liquid meal coolant for circulating the coolant through the primary heat exchanging circuit said support cylinder having multiple flow slots passing therethrough in an upper portion of the cylinder adjacent to the upper flange and multiple flow slots passing therethrough in a lower portion of the cylinder adjacent to the lower flanges providing for a secondary heat exchanging convection circuit for the liquid metal coolant passing into the support cylinder through the lower flow slots and upward through a space between the primary heat exchanger cylinder and the core support cylinder and then out from the space through the upper flow slots for carrying heat away from the primary heat transferring circuit, said fluid flow slots passing through the fuel assembly support cylinder between the inward projecting upper and lower flange of the assembly support cylinder, and a flow guiding skirt extending around the assembly support cylinder in spaced apart relationship between the upper and lower flow slots whereby the liquid metal coolant flows downward external to the flow guiding skirt when circulating through the secondary heat exchanging convection circuit.

* * * * *